UNITED STATES PATENT OFFICE.

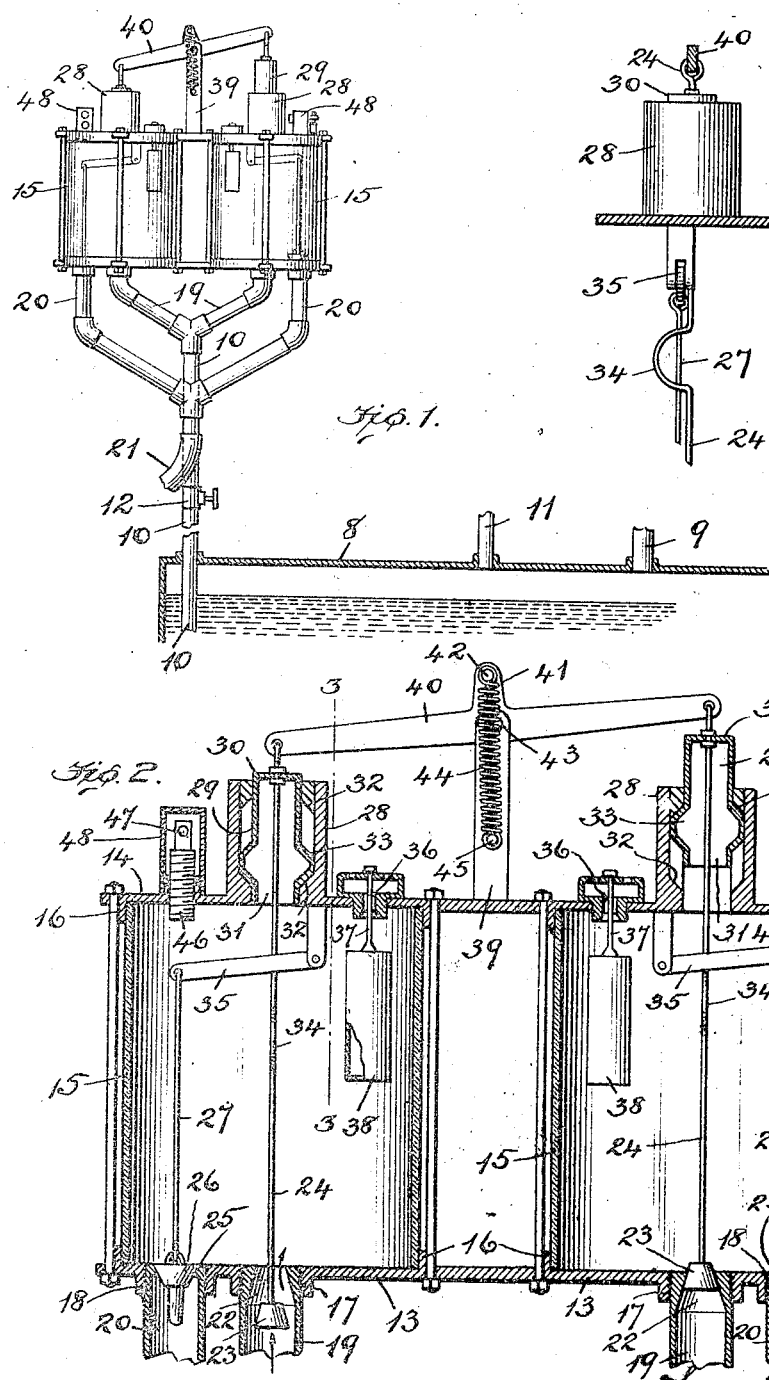

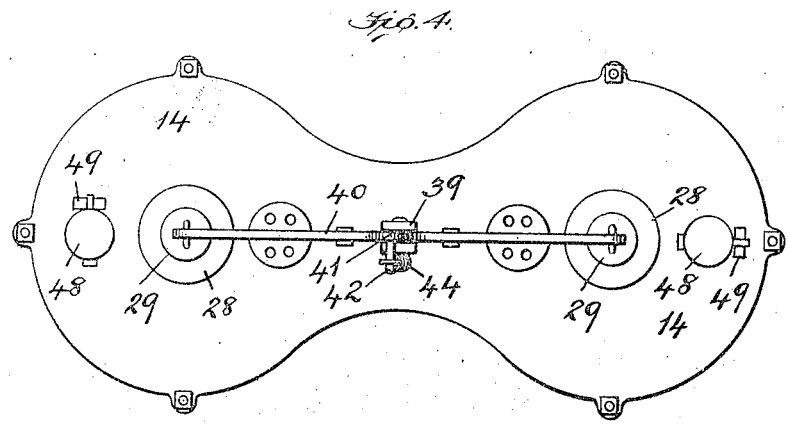
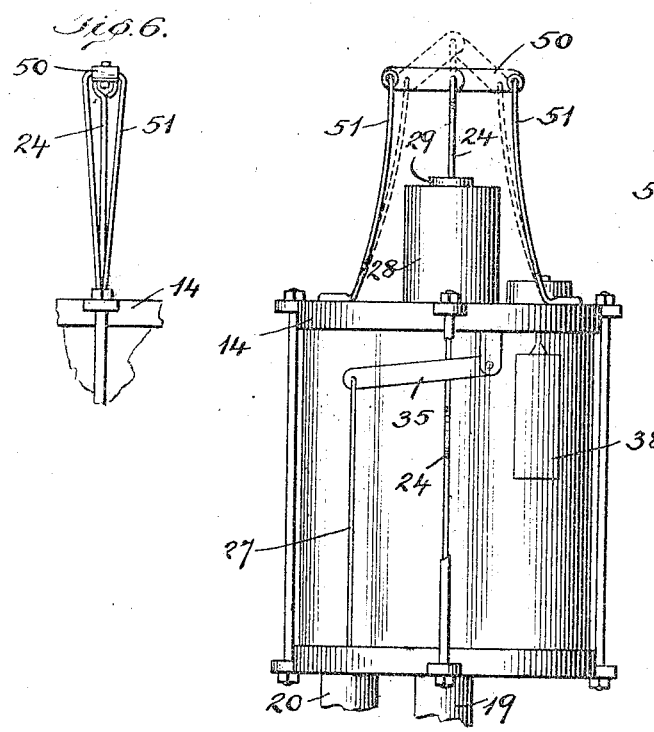

SAMUEL R. BASHORE, OF PORT ROYAL, PENNSYLVANIA, ASSIGNOR OF ONE-FOURTH TO GEORGE K. BASHORE, OF BALTIMORE, MARYLAND.

LIQUID MEASURING AND DISPENSING APPARATUS.

1,262,595.

Specification of Letters Patent.

Patented Apr. 9, 1918.

Application filed November 1, 1916. Serial No. 128,835.

*To all whom it may concern:*

Be it known that I, SAMUEL R. BASHORE, a citizen of the United States, residing at Port Royal, in the county of Juniata and State of Pennsylvania, have invented certain new and useful Improvements in Liquid Measuring and Dispensing Apparatus, of which the following is a specification.

This invention relates to an improved liquid measuring and dispensing apparatus, and is designed particularly for dispensing measured fluids, such for example, as gasolene.

One object of the invention is to provide an improved apparatus that will automatically measure and discharge the measured fluid.

Another object of the invention is to provide an improved construction of apparatus whereby the fluid that is being dispensed may be seen by the purchaser during the measuring and dispensing operation.

A further object is to provide an improved apparatus that will automatically cut off the inlet and open the outlet when a predetermined quantity of fluid has been measured.

A still further object of the invention is to provide a construction of apparatus whereby two measuring receptacles may be employed and so connected that one receptacle may receive fluid while the other is discharging a measured quantity of fluid, thereby materially facilitating the operation of dispensing the desired quantity of fluid.

With these, and other objects in view, the invention is illustrated in the accompanying drawings, wherein,—

Figure 1, shows the improved device coupled with a storage tank from which the fluid is to be drawn.

Fig. 2, illustrates on an enlarged scale, a vertical sectional detail through the two measuring receptacles with the valves and connecting parts in position to cause a filling of one receptacle and a discharge of fluid from the other receptacle.

Fig. 3, shows a detail of the valve actuating mechanism, part of which is in section and as viewed on the line 3—3 of Fig. 2.

Fig. 4, illustrates in top plan, the apparatus shown in Fig. 2.

Fig. 5, shows a single receptacle device in front view embodying the invention.

Fig. 6, illustrates in side elevation the spring device to control the tripping of the valve rods, and Fig. 7, shows the toggle-joint connection in perspective.

Referring to the drawings, the numeral 8, designates a storage tank for the oil or fluid which is to be dispensed in measured quantities, and said tank is provided with a filling pipe 9; a feed pipe 10, through which the fluid is drawn off, and an air supply pipe 11, through which, air under pressure may be supplied to the tank to place the contents under pressure and effect an automatic discharge of the fluid therefrom when the feed-pipe 10, is opened.

The feed pipe 10, extends from the tank 8, to and connects with the bottom of the measuring receptacle or receptacles, and a valve 12, is provided in said pipe to control the passage of the fluid through said pipe.

The measuring receptacles are alike in construction, no matter whether they be used singly or in pairs, the only difference being that in the use of two receptacles a valve lever is employed to effect a movement of the valves in one receptacle that is reverse to the movement of the corresponding valves in the other receptacle.

The construction of the measuring receptacle is best disclosed in Fig. 2, of the drawing to which particular reference will now be made.

In the preferred construction, the measuring receptacles have a bottom 13, and a top 14, between which a cylindrical glass shell 15, is clamped. I prefer to employ glass in the construction of the shells because the interior thereof may be seen and the fluid being measured and dispensed can thus be viewed.

In the form shown in Fig. 2, of the drawing, the bottom 13, and top 14, are each of sufficient size to provide two circular flanges 16, so that two shells 15, may be clamped between them.

The bottoms have two circular apertures 17, and 18, respectively, the former of which is connected by a branch pipe 19, with the feed pipe 10, from the storage tank, and to the latter is connected a discharge branch-pipe 20, which empties into a hose or other pipe 21, to carry off the measured fluid.

Pipe 19, is provided with a tapered valve seat 22, so that a valve 23, on the lower end of a vertical stem or rod 24, may hang pendantly in the pipe below the seat during the filling of the receptacle, but when raised, will engage the seat 22, and cut off the entrance of fluid to the receptacle.

Branch pipe 20, also has a valve seat 25, in order that a valve 26, on the lower end of a pendant stem or rod 27, may seat thereon and thus cut off the escape of fluid from the receptacle.

The top of each receptacle is provided with a tubular extension 28, which has position directly over the valve seat 22, and a shell 29, having an outer closed end 30, and in the present instance an open inner end 31, fits said tubular extension and is capable of longitudinal movement therein somewhat like a piston. The tubular extension is provided on its interior with a lower and an upper tapered seat 32, while the shell 29, has a circumferentially-bulged portion 33, which engages the lower seat when the shell is down and engages the upper seat when said shell is up or raised.

The valve rod or stem 24, that carries the inlet valve 23, extends vertically through the measuring receptacle and also through the shell 29, and said rod is attached to the closed end 30, of the shell, whereby vertical movement of the shell, rod and valve 23, will be effected at the same time.

In the present instance I desire to utilize the vertical movement of the rod 24, to effect a movement of the stem 27, that controls the escape valve 26, and to that end I provide a shoulder, loop or projection 34, on the rod 24, adjacent to a lever 35, to which the stem 27, is attached.

The lever 35, extends in a direction crosswise with respect to the loop or projection 34, and, in the present instance above the latter, so that as the rod 24, is raised, the loop or projection 34, will engage the lever 35, and lift it, thereby pulling stem 27 up and unseating escape valve 26, at the time the feed valve 23, is moved to the closed position.

The top 14, of each shell or receptacle has a vent port 36, and a stem 37, extends freely through said port from the inner side of the measuring receptacle and at its inner end said stem carries a float 38. In practice this float moves upward after it is sufficiently submerged in the fluid that is being measured, and the displaced air caused by the inflowing fluid will escape through the port 36, until the float 38, is raised sufficiently to seat against and seal the inner end of the port, whereupon the liquid will be retained in the receptacle, and as the fluid continues to flow into the bottom of the receptacle, the pressure accumulating at the top, (because port 36, will have been closed) will be applied to the shell 29, until said pressure is sufficient to push said shell upward. When the shell is moved upwardly it pulls rod 24, up, and seats valve 23, to cut off the inflow of fluid to the receptacle 15, and just as the valve 23, is about to seat against the seat 22, the loop 34, on rod 24, will engage the lever 35, and raise the latter, thereby lifting stem 27, and raising the valve 26, from the seat 25, to permit the fluid to run off through pipe 20.

When the feed-in valve 23 has been closed, and the discharge-valve 26, has been opened, it is necessary to provide some means for keeping the rod 27, raised until the measured fluid has all been discharged from the receptacle. It is also desirable that the closing of the inlet and the opening of the outlet valves be effected quickly in order that there be no appreciable period when both valves be open. When two receptacles are employed,—one to be filled while the other is discharging, I have found it convenient to employ a single rock lever through which both valves in the two receptacles may be readily actuated, as will now be explained in connection with the illustration in Fig. 2, of the drawing.

On the top 14, of and between the two measuring receptacles I provide a vertical post 39, and to the upper end of this post I pivotally connect a rock lever 40. This rock lever has one end terminating over the center of the shell 29, of one measuring receptacle, and its other end terminating over the center of the shell 29, of the other measuring receptacle. Each end of the rock lever is pivotally connected to the upper end of the rod 24, or the shell 29, just beneath it so that when either shell moves up it will push up with it the end of the rock lever immediately above it, and, of course, swing the opposite end of the lever, and the shell with which it is connected, down.

Midway between the ends, the rock lever is provided with an upwardly-projecting portion 41, from the side of which a pin 42, projects. The distance between the pin, 42, and the pivot 43, of the rock lever is sufficient to cause the center of the pin to take position to one side or the other of the center of the pivot 43, when the rock lever is swung in either of its two positions, and a coiled spring 44, has one end connected to the pin 42, and its other end connected to a pin 45, on the post 39, below so that when one end of the rock lever is pushed up the pin 42, will swing through an arc from one side of the vertical center of pivot 43, to the opposite side of said vertical center of said pivot, and as it passes over said vertical center, the coiled spring 44, will draw on the pin 42, and pull it and the lever down and hold it on that side to which it is swinging.

I have found that to attain accuracy in the measurement of the fluid means should be provided to effect a slight variation in the capacity of the measuring receptacle and to do this, I provide a displacement plug 46, which may be screwed down through the top 14, to project more or less into the interior of the receptacle. The outer end of this plug is preferably squared and has a perforation 47, therethrough for a purpose that will presently be explained. After the plug has been turned to effect the adjustment, I prefer to place a cylindrical cap 48, over the same, which cap is provided with a series of circumferential perforations 48' so that a pin may be passed through one of said perforations 48', then through the perforation 47, in the plug and a seal or lock 49, attached to the end of the pin to prevent its removal for the purpose of fraudulently turning the plug.

When a single measuring device is employed the mechanism is the same as that employed in the operation of two receptacles with the exception that, as shown in Figs. 5—6 and 7, of the drawings, the rod 24, has its upper end pivotally connected to the lapped ends of a pair of links 50, while the outer end of each link is carried on the upper end of a spring rod 51. Normally these spring rods have their upper ends sprung outwardly when the links and the rod 24, are down in position to keep the feed or inlet valve open and the outlet valve closed, as shown in full lines in Fig. 5, but will spring toward each other as the shell 29, raises the rod 24, to break the joint of the links as shown in broken lines in said Fig. 5.

Having described my invention what I claim is,—

1. The combination with a measuring receptacle having an inlet and an outlet, of a valve to control the inlet; a valve to control the outlet; a separate stem extending into the receptacle from each of said valves; a float suspended in the receptacle and controlling a vent port; a reciprocating shell exposed to the pressure in the receptacle and said shell having connection with one of said valve stems and means for operating the other valve stem when the shell and its attached valve stem are operated.

2. The combination with a measuring receptacle having an inlet and an outlet and also provided with a vent-port, of a valve to control the inlet; a valve to control the outlet; a float pendantly sustained in the receptacle to control the vent port; a pressure-actuated device in the receptacle; a stem connecting the pressure-actuated device with one of said valves; a stem attached to the other of said valves and means actuated by the movement of the first-named stem to operate the last-named stem.

3. The combination with a measuring receptacle having an inlet and an outlet both of which are at the same end of the receptacle, of a valve to control the inlet; a valve to control the outlet; a pressure-actuated shell at the other end of the receptacle and opposite the valves and subject to the pressure in the receptacle; a vent independent of the pressure shell and controlled by a float, and means operated by the pressure-actuated shell to close one valve and open the other valve.

4. The combination with a measuring receptacle having a top and bottom with an inlet and an outlet located in said bottom, of a tubular extension in the top of and having one end communicating with the interior of the receptacle; a shell located in said extension and movable in the latter; a stem connecting the inlet valve with said shell and means connected with the outlet valve and operated by the movement of the shell to open the latter valve when the shell moves to close the inlet valve.

5. The combination with a measuring receptacle having an inlet and an outlet, of a valve to control the inlet; a valve to control the outlet; a tubular extension at the side of the receptacle opposite that where the valves are located; a shell movable lengthwise in said extension and subject to the pressure in the receptacle; spring means having connection with the shell for operating it suddenly in one direction and means operated by the pressure-actuated device to close one valve and open the other.

6. The combination with two side-by-side measuring receptacles each having a top and a bottom and the bottom of each receptacle having an inlet and an outlet, of a separate valve to control each inlet; a separate valve to control each outlet; a pressure-actuated shell in the top of each receptacle and each shell being subject to the pressure in the receptacle beneath it; means for connecting the two pressure-actuated shells, and means operated by each pressure-actuated shell to open one valve in each receptacle and close the other valve in each receptacle.

7. The combination with two measuring receptacles each having a top and a bottom and the bottom of each receptacle having an inlet and an outlet, of a separate valve for each inlet; a separate valve for each outlet; a movable shell in the top of each receptacle and each shell being subject to the pressure in the receptacle beneath it; a means connecting the two shells; a stem connecting each shell with the inlet valve beneath it, and means operated by each shell for opening the outlet valve when the inlet valve closes.

In testimony whereof I affix my signature in the presence of two witnesses.

SAMUEL R. BASHORE.

Witnesses:
N. K. JOHNSON,
ADAM B. HECKERMAN.